US007948118B2

(12) United States Patent
Chambon

(10) Patent No.: US 7,948,118 B2
(45) Date of Patent: May 24, 2011

(54) UNINTERRUPTIBLE POWER SUPPLY AND METHOD FOR IMPLEMENTING SAID POWER SUPPLY

(75) Inventor: Patrick Chambon, Saint Martin d'Heres (FR)

(73) Assignee: MGE UPS Systems, Zirst-Montbonnot Saint Martin (FR)

( * ) Notice: Subject to any disclaimer, the term of this patent is extended or adjusted under 35 U.S.C. 154(b) by 84 days.

(21) Appl. No.: 12/149,681

(22) Filed: May 6, 2008

(65) Prior Publication Data

US 2008/0278005 A1 Nov. 13, 2008

(30) Foreign Application Priority Data

May 11, 2007 (FR) ..................................... 07 03373

(51) Int. Cl.
*H02J 9/00* (2006.01)

(52) U.S. Cl. ........................................................ 307/66

(58) Field of Classification Search ..................... 307/66
See application file for complete search history.

(56) References Cited

U.S. PATENT DOCUMENTS 4,763,013 A * 8/1988 Gvoth et al. .................... 307/66
5,172,009 A * 12/1992 Mohan ............................ 307/46
5,612,580 A * 3/1997 Janonis et al. .................. 307/64
6,118,676 A * 9/2000 Divan et al. ..................... 363/34
6,201,371 B1 3/2001 Kawabe et al.
6,295,215 B1 * 9/2001 Faria et al. ...................... 363/37
6,603,672 B1 * 8/2003 Deng et al. ...................... 363/37
6,906,933 B2 * 6/2005 Taimela .......................... 363/37
6,917,124 B2 * 7/2005 Shetler et al. .................. 307/66
7,050,312 B2 * 5/2006 Tracy et al. ..................... 363/37
7,391,132 B2 * 6/2008 Chen .............................. 307/43
7,456,520 B2 * 11/2008 Colombi et al. ................ 307/64
7,508,094 B2 * 3/2009 Johnson et al. ................. 307/64
7,566,988 B2 * 7/2009 Heber et al. .................... 307/44
7,649,758 B2 * 1/2010 Taimela et al. ................. 363/98
2003/0184160 A1 10/2003 Yamamoto
2004/0084965 A1 * 5/2004 Welches et al. ................. 307/64
2005/0012395 A1 * 1/2005 Eckroad et al. ................. 307/44
2005/0201127 A1 9/2005 Tracy et al.
2006/0043793 A1 * 3/2006 Hjort et al. ........................ 307/1
2007/0040534 A1 * 2/2007 Ghosh et al. .................. 323/207
2009/0237963 A1 * 9/2009 Prasad et al. .................... 363/40

* cited by examiner

*Primary Examiner* — Jared J Fureman
*Assistant Examiner* — Adi Amrany
(74) *Attorney, Agent, or Firm* — Steptoe & Johnson LLP

(57) ABSTRACT

An uninterruptible power supply including at least one first input, a power supply output, a first converter which is shut down when operating in economic mode, a reversible second converter, a branching and/or selection circuit for connecting an input directly to the power supply output when operating in economic mode, and control units for use when operating with the input disconnected from the power supply output, and switching between some of the units to regulate the current at the input when operating in economic mode.

20 Claims, 6 Drawing Sheets

UNINTERRUPTIBLE POWER SUPPLY AND METHOD FOR IMPLEMENTING SAID POWER SUPPLY

BACKGROUND OF THE INVENTION

The invention relates to an uninterruptible power supply.

The invention also relates to a method for performing supply of uninterruptible electric power.

STATE OF THE ART

American U.S. Pat. No. 6,295,215 describes an uninterruptible power supply including an input designed to be connected to an AC voltage source and a power supply output designed to be connected to an electric load. This uninterruptible power supply includes means for converting an AC voltage on the input into DC voltage, means for converting the DC voltage into AC voltage on the output, and a branching and/or selection circuit equipped with interrupting means to connect the input to the power supply output. This uninterruptible power supply further includes control means equipped with at least two units, one dedicated to a normal operating mode and the other dedicated to an economic operating mode.

In economic operating mode, the input is connected to the power supply output by interrupting means of the branching and/or selection circuit. In economic operating mode, the unit dedicated to economic operating mode is implemented such that the means for converting DC voltage into AC voltage supplies reactive and harmonic currents to keep the power factor and other power quality parameters at a required level.

Uninterruptible power supply control means of the prior art are not optimized and require a large number of components and/or functional steps. In particular, operation of uninterruptible power supplies of the prior art in economic mode requires implementation of additional regulation modules.

SUMMARY OF THE INVENTION

The object of the invention is to remedy the shortcomings of uninterruptible power supplies of the prior art by proposing an uninterruptible power supply including at least one first input designed to be connected to a first AC voltage source, a power supply output designed to be connected to an electric load, a first converter converting the AC voltage on the first input into DC voltage, a bi-directional second converter converting the DC voltage into AC voltage on the power supply output, a branching and/or selection circuit equipped with interrupting means to connect a second input directly to the power supply output when operating in an economic mode, and control means including a set of units used when operating in normal mode in which the second input is disconnected from the power supply output by opening the interrupting means of the branching and/or selection circuit.

The uninterruptible power supply according to the invention is characterized in that, when operating in the economic mode, the first converter is shut down, in that the set of units includes a first voltage regulation unit equipped with an output to supply a first reference current and a second current regulation unit of the second converter equipped with a reference current input, and in that the control means includes switching means designed to connect the output of the first voltage regulation unit to the second input of the second current regulation unit to regulate the quality of the current on said input when operating in the economic mode.

Preferably, the set of units used when operating in normal mode includes a first current regulation unit of the first converter equipped with a reference current input, the first current regulation unit being shut down when operating in the economic mode.

Preferably, the set of units used when operating in normal mode includes a second voltage regulation unit equipped with an output to supply a second reference current, the output of the first voltage regulation unit being connected to the reference current input of the first current regulation unit and the output of the second voltage regulation unit being connected to the reference current input of the second current regulation unit, when operating in normal mode.

Preferably, the switching means includes a first switch and a second switch to connect the output of the first voltage regulation unit to the input of the first current regulation unit by means of the first switch when operating in normal mode, connect the output of the second voltage regulation unit to the input of the second current regulation unit by means of the second switch, connect the output of the first voltage regulation unit to an intermediate connection means by means of the first switch and connect the input of the second current regulation unit to said connection means by means of the second switch, when operating in the economic mode.

According to one embodiment of the invention, the set of units used when operating in normal mode includes at least one first reference AC signal generator equipped with an output and connected to means for measuring the AC voltage on the first input, the first generator generating a reference AC signal on the output in phase with the AC voltage on the first input.

According to one embodiment of the invention, the second input is designed to be connected to a second AC voltage source, the interrupting means of the branching and/or selection circuit enabling the second input to be connected directly to the power supply output when operating in the economic mode.

Preferably, the set of units used when operating in normal mode includes a second reference AC signal generator equipped with an output and connected to means for measuring the AC voltage on the second input, the second generator generating a reference AC signal on said output in phase with the AC voltage on the second input.

Preferably, the switching means includes a third switch to connect a synchronization input of the first voltage regulation unit to the output of the first generator when operating in normal mode, and connect the synchronization input of the first voltage regulation unit to the output of the second generator when operating in the economic mode.

According to one embodiment of the invention, the units used when operating in normal mode are electronic circuits, and the switches are multiplexers or analog switches controlled by a processing unit.

According to another embodiment of the invention, the units used when operating in normal mode, and the switches are software means of a processing unit.

Advantageously, the uninterruptible power supply according to the invention includes electric power storage means arranged between the first and second converter.

The invention also relates to a method for providing an uninterruptible electric power supply including application of a first AC voltage on at least one first input, supply of an uninterruptible electric power supply on a power supply output, a first conversion of the first AC voltage into DC voltage, a second conversion of the DC voltage into AC supply voltage, in either direction, when operating in an economic mode, achieving a direct connection of a second input to the power supply output, and control of the uninterruptible electric power supply by a set of regulation functions used when operating in normal mode in which the direct connection is interrupted.

The method of the invention is characterized in that, when operating in economic mode, it includes stopping the first conversion, in that control of the uninterruptible electric power supply includes a first voltage regulation function to supply a first reference current and a second current regulation function of the second converter from a reference current, and that, when operating in economic mode, switching enables the first reference current to be applied to the second current regulation function to regulate the quality of the current on the input.

Preferably, the set of functions used when operating in normal mode includes a first current regulation function of the first converter from a reference current, the first current regulation function being stopped when operating in the economic mode.

Preferably, the set of functions used when operating in normal mode includes a second voltage regulation function to supply a second reference current when operating in normal mode, the first reference current supplied by the first voltage regulation function being applied to the first current regulation function and the second reference current supplied by the second voltage regulation function being applied to the second current regulation function.

Advantageously, the switching enables the first reference current to be applied to the first current regulation function, the second reference current to be applied to the second current regulation function when operating in normal mode, and the first reference current to be applied to the second current regulation function when operating in the economic mode.

According to an embodiment of the method according to the invention, the set of functions used when operating in normal mode includes generation of a first reference AC signal synchronized with the first AC voltage to supply a reference AC signal in phase with the first AC voltage.

According to an embodiment of the method according to the invention, said method includes application of a second AC voltage on the second input when operating in the economic mode, the second input being connected to the power supply output.

Preferably, the set of functions used when operating in normal mode includes generation of a second reference AC signal synchronized with the second AC voltage to supply a reference AC signal in phase with the second AC voltage.

Advantageously, the switching enables the first reference current to be synchronized with the first reference AC signal when operating in normal mode, and the first reference current to be synchronized with the second reference AC signal when operating in the economic mode.

According to an embodiment of the method of the invention, the method includes storing of electric power, by the first conversion of the first AC voltage into DC voltage, when operating in normal mode, and by the second conversion, in the opposite direction, of the AC supply voltage into DC voltage when operating in the economic mode.

BRIEF DESCRIPTION OF THE DRAWINGS

Other advantages and features will become more clearly apparent from the following description of particular embodiments of the invention, given as non-restrictive examples only and represented in the accompanying figures.

FIG. 2 represents operation in normal mode.

DETAILED DESCRIPTION OF AN EMBODIMENT

Figure 1:
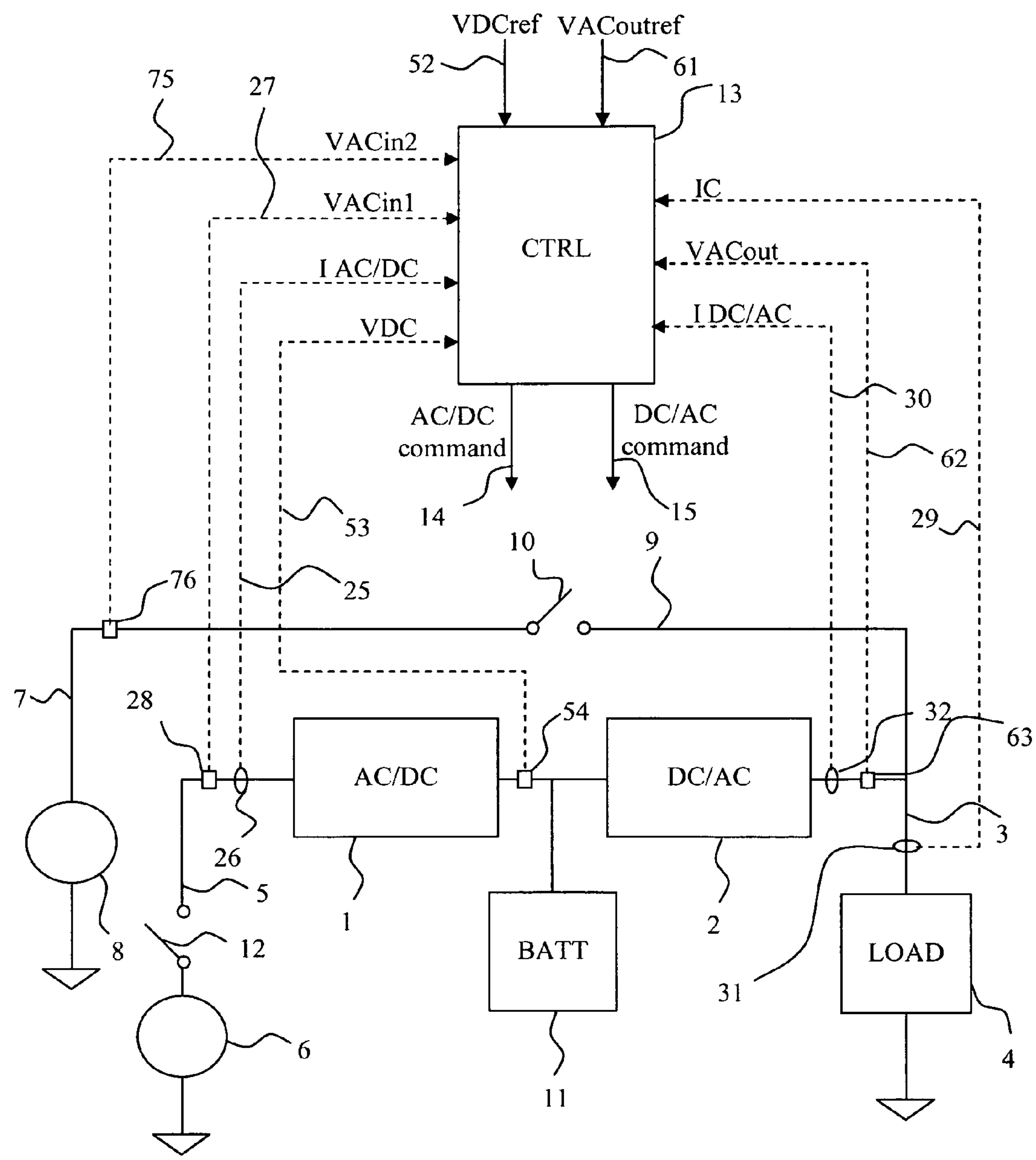
FIG. 1 schematically represents an uninterruptible power supply according to an embodiment of the invention and of the associated control means.

The uninterruptible power supply represented in FIG. 1 corresponds to a preferred embodiment of the invention of the double conversion type, i.e. comprising a first converter 1 converting an AC voltage VACin1 into a DC voltage VDC, and a reversible second converter 2 converting the DC voltage VDC into AC voltage VACout on a power supply output 3 designed to be connected to an electric load 4. Uninterruptible power supplies of the double conversion type are in particular suitable for production of medium and high power electric energy.

The first converter is preferably of the "PFC" type, i.e. enabling power factor correction on a first input 5 to make this power factor tend to one.

In the embodiment represented in FIG. 1, the uninterruptible power supply includes two inputs, first input 5 being designed to be connected to a first source 6, also called normal AC. Second input 7 is designed to be connected to a second source 8 called bypass AC. The uninterruptible power supply also includes a branching and/or selection circuit 9 equipped with interrupting means 10 to directly connect an input, viz. second input 7, to power supply output 3 when operating in economic mode. The uninterruptible power supply represented in FIG. 1 also means for storing electric power, for example a battery 11 arranged between the first and second converter. The uninterruptible power supply represented in FIG. 1 enables operation in two distinct modes: normal mode and economic mode.

When operating in normal mode, load 4 is supplied by the conversion system including first converter 1 and second converter 2. When operating in normal mode, the converters can be on line, i.e. first converter 1 converting AC voltage of first input 5 into DC voltage VDC, and second converter 2 converting DC voltage VDC into AC voltage VACout on power supply output 3. When operating in normal mode, the converters can also be in standalone state in the case where the source connected to the first input no longer supplies any power or supplies power outside certain tolerance limits. In this case, only the second converter is used to convert a DC voltage, production of the latter being performed by battery 11 or by a DC/DC conversion module comprising said battery 11.

When operating in economic mode, the interrupting means 10 is closed, and the load is supplied via branching and/or selection circuit 9. In the uninterruptible power supply represented in FIG. 1, there are two inputs connected to two distinct sources: a first source often referred to as normal AC supply and a second source often referred to as bypass AC supply. In the embodiment represented in FIG. 1, switching to economic mode corresponds to selecting the second source and connection of this second source with the power supply output. In parallel, the first source is disconnected from the first input by interrupting means 12. In another embodiment that is not represented in which the uninterruptible power supply includes a single input designed to be connected to a single source, switching to economic mode corresponds to branching of this single input onto the power supply output.

The uninterruptible power supply represented in FIG. 1 includes control means 13 designed to control first converter 1 and second converter 2 respectively by means of control outputs 14 and 15. Control of these converters can be performed by current regulation using for example pulse-width modulation techniques, or PWM in short.

Figure 2:
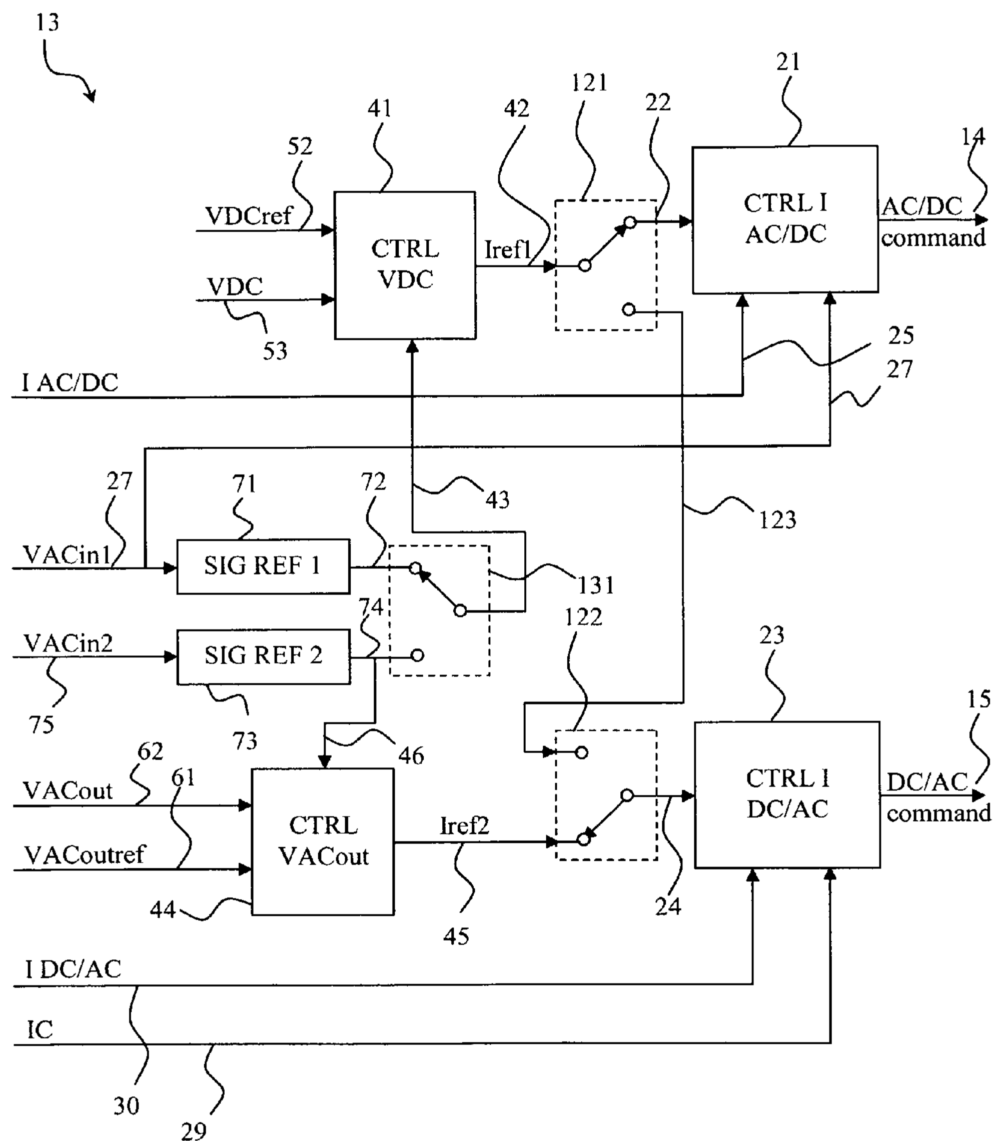
FIG. 2 represents in more detailed manner the units and associated regulation functions of the control means.
Figure 3:
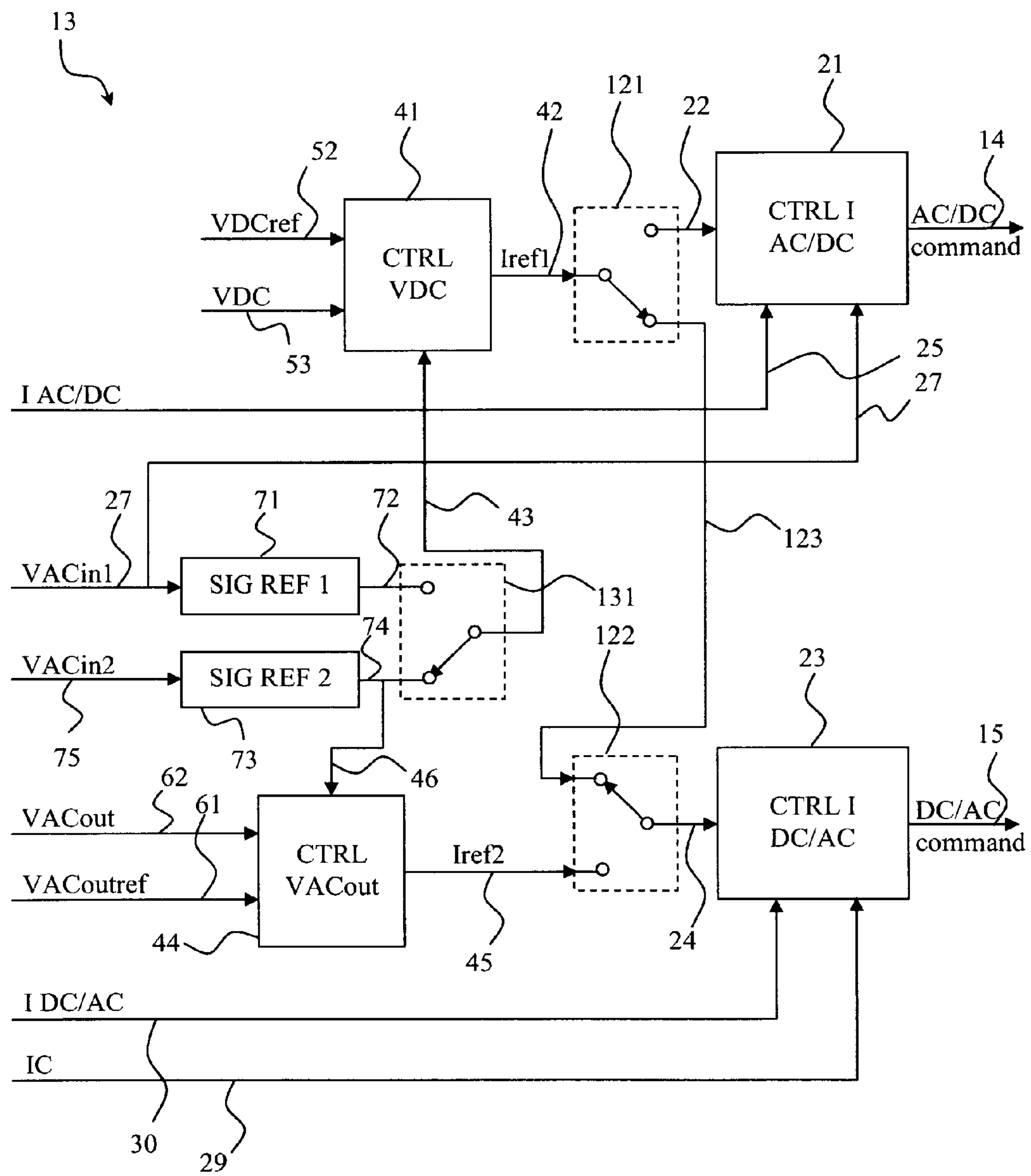
FIG. 3 represents operation in economic mode.

The control means are represented in more precise manner in FIGS. 2 and 3. FIG. 2 corresponds to operation in normal mode, whereas FIG. 3 corresponds to operation in economic mode. Control means 13 includes a set of units used when operating in normal mode in which the second input is disconnected from the power supply output by opening of interrupting means 10 of branching and/or selection circuit 9.

According to a first feature, control means 13 is achieved in such a way as to regulate the quality of the current on second input 7, when operating in economic mode, while keeping the first converter shut down. What is generally meant by regulating the quality of the current on second input 7 is minimizing the harmonics and/or the reactive part of this current.

According to a second feature, control means 13 includes switching means between the units, or at least a part of the units, which are used when operating in normal mode. Due to these switching means, operation in economic mode can be envisaged using only at least a part of the units provided for operation in normal mode, i.e. without adding any additional units dedicated for operation in economic mode.

As represented in FIGS. 2 and 3, control means 13 includes units associated with regulation functions, and switching means for switching between a part of the set of units used when operating in normal mode.

As represented in FIGS. 2 and 3, the set of units used when operating in normal mode includes a first current regulation unit 21 of first converter 1 equipped with a reference current input 22 and including control output 14. In the same way, a second current regulation unit 23 of the second converter is equipped with a reference current input 24 and includes control output 15. The first and second current regulation units respectively perform control of the first and second converter.

Figure 4:
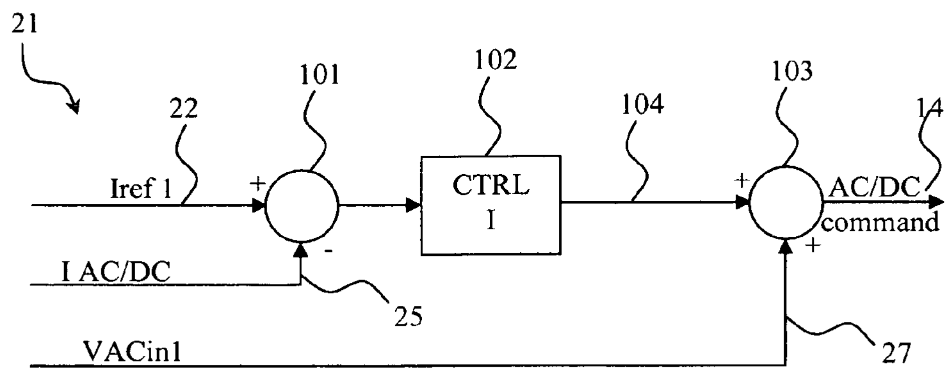
FIG. 4 represents the first current regulation unit of the first converter and the associated function.

First current regulation unit 21 is represented in more detailed manner in FIG. 4. It includes a comparator 101 between a reference current Iref1 on input 22 and the current value I AC/DC on first input of the first converter, this value being available on a line 25. What is meant by comparator is a module whose function is to compare values, in this instance current intensities, to deliver a value corresponding to the variance or difference between these two values. A comparator can also be called a subtractor. As represented in FIG. 1, line 25 is connected to means 26 for measuring current I AC/DC on first input of the first converter. The comparator output is connected to a current regulator 102 to minimize the output value of comparator 101, i.e. the difference between reference current Iref1 and current value I AC/DC, by determining a setpoint value on an output 104. Current regulator 102 can advantageously be a regulator with a minimal response time or a PID regulator, i.e. including proportional, integral, and derivative functions. A summer or adder 103 adds the value obtained on an output 104 of current regulator 102 with the value of AC voltage VACin1 on first input 5, the latter value being available on a line 27. This operation thereby optimizes operation of current regulator 102 making a disturbance compensation. As represented in FIG. 1, line 27 is connected to means 28 for measuring AC voltage VACin1 on first input 5. The output of comparator 103 is for its part connected to control output 14.

Figure 5:
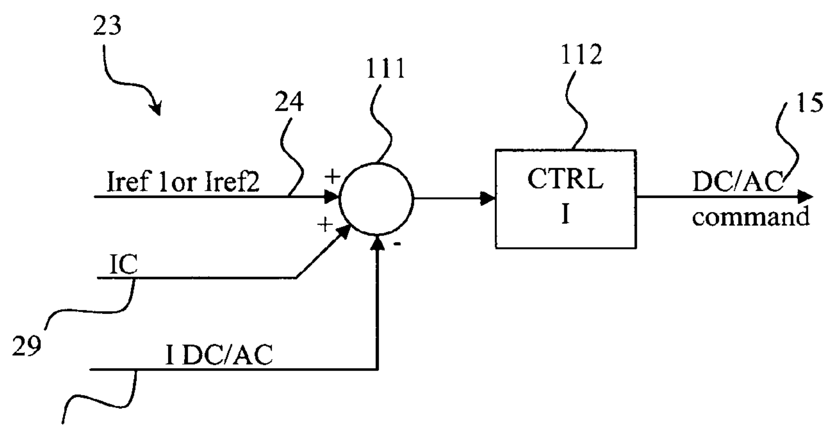
FIG. 5 represents the second current regulation unit of the second converter and the associated function.

Second current regulation unit 23 is represented in more detailed manner in FIG. 5. It includes a comparator/summer 111 on the one hand summing a reference current Iref1 or Iref2 on input 24 and a current IC in the load the value of which is available on a line 29, and on the other hand determining the difference between the result of this sum and the value of a current I DC/AC on output from the second converter available on a line 30. As represented in FIG. 1, lines 29 and 30 are connected to means 31 and 32 for measuring respectively current IC in the load and current I DC/AC on output from the second converter. The output of the comparator/summer is connected to a current regulator 112 minimizing the output value of comparator/summer 111 by generating a control signal on a control output 15. Current regulator 112 can advantageously be a minimal response time regulator or a PID regulator, i.e. including proportional, integral, and derivative functions.

Figure 6:
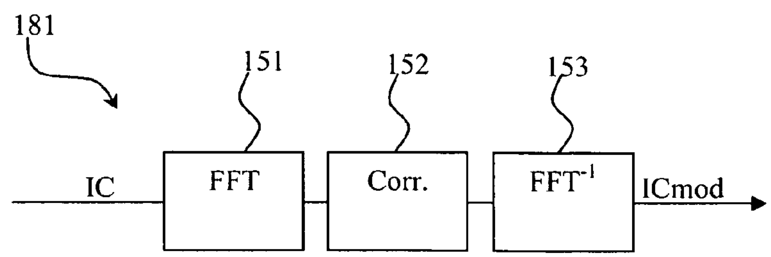
FIG. 6 represents a load current processing unit used in a particular embodiment.

According to a particular embodiment, control means 13 can further include a processing unit 181 of current IC in load 4. This unit can be connected line-side from second current regulation unit 23, i.e. on line 29. As represented in FIG. 6, processing unit 181 of current IC includes a fast Fourier transform module 151 enabling a Fourier transform of the current in the load to be obtained, a correction module 152 and an inverse Fourier transform module 153. In economic mode, the modified charging current ICmod is sent to second current regulation unit 23. In normal mode, by-pass means, not represented, enable the non-modified charging current value to be sent directly to second current regulation unit 23. Processing unit 181 of current IC thus enables the reaction time of second current regulation unit 23 to be minimized.

As described above, control means 13 are provided to regulate the quality of the current on input 7, when operating in economic mode, while keeping the first converter shut down. Thus, when operating in economic mode, the first current regulation unit is shut down.

As represented in FIGS. 2 and 3, the set of units used when operating in normal mode further includes a first voltage regulation unit 41 regulating DC voltage VDC between the two converters. This first voltage regulation unit is equipped with an output 42 to supply a first reference current Iref1 and with a synchronization input 43. In the same way, a second voltage regulation unit 44 regulates AC voltage VACout on output 3. This second voltage regulation unit is equipped with an output 45 to supply a second reference current Iref2 and with a synchronization input 46.

Figure 7:
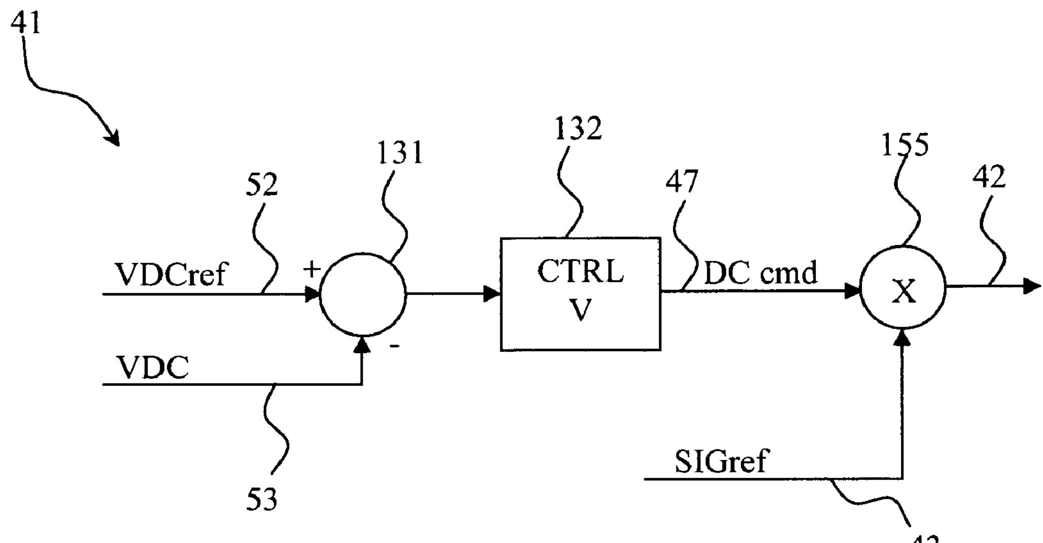
FIG. 7 represents the first voltage regulation unit of the second converter and the associated function.

First voltage regulation unit 41 is represented in more detailed manner in FIG. 7. It includes a multiplier 155 generating first reference current Iref1 from a control signal CdeDC available on a line 47, and from a reference signal SIGref available on synchronization input 43. First voltage regulation unit 41 converts control signal CdeDC, which is of DC type into a reference current Iref1 of AC type. Control signal CdeDC available on line 47 is determined by a voltage regulator 132 having the function of minimizing the variance between DC voltage VDC between the two converters and the value of a setpoint VDCref of said DC voltage. Voltage regulator 132 can advantageously be a minimal response time regulator or a PID regulator, i.e. including proportional, integral, and derivative functions. The difference between DC voltage VDC and the value of a setpoint VDCref of said DC voltage is determined by a comparator 131. What is meant by comparator is a module whose function is to compare values, in this instance voltages, to deliver a value corresponding to the variance or difference between these two values. The value of DC voltage VDC is available on line 53 and setpoint value VDCref of said voltage is available on line 52. As represented in FIG. 1, line 53 is connected to means 54 for measuring DC voltage VDC between the two converters.

Figure 8:
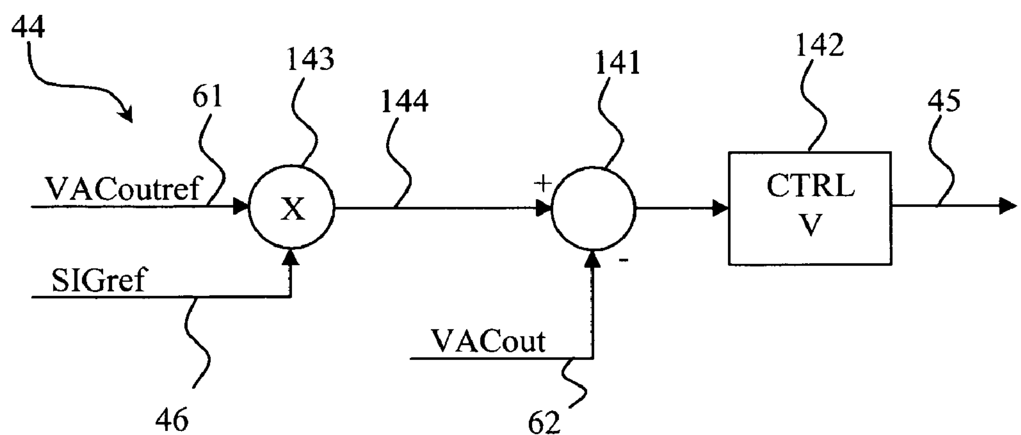
FIG. 8 represents the second voltage regulation unit of the second converter and the associated function.

Second voltage regulation unit 44 is represented in more detailed manner in FIG. 8. It includes a multiplier 143 multiplying a setpoint value of AC voltage VACout on output 3 by a reference signal SIGref available on synchronization input 46. The setpoint value of AC voltage VACout is generally representative of an rms voltage and is available on a line 61. When operating in normal mode, a voltage setpoint is thus supplied on output 144 of this multiplier 143. Second voltage regulation unit 44 further includes a comparator 141 between the voltage setpoint value on line 144 on the one hand and the AC voltage value VACout on the power supply output on the other hand, this value being available on a line 62. What is meant by comparator is a module whose function is to compare values, in this instance voltages, to deliver a value corresponding to the variance or difference between these two values. As represented in FIG. 1, line 62 is connected to means 63 for measuring AC voltage VACout on the power supply output. The output of comparator 141 is connected to a voltage regulator 142 whose output 45 is designed to supply second reference current Iref2. In normal mode, regulator 142 has the function of generating second reference current Iref2 to obtain an AC voltage VACout on output 3 tending to the voltage setpoint supplied on output 144 of multiplier, 143, regardless of the power variations of load 4 connected on output 3.

As represented in FIGS. 2 and 3, the set of units used when operating in normal mode further includes a first reference AC signal generator 71 equipped with an output 72 and connected via line 27 to means 28 for measuring the AC voltage on first input VACin1. This first generator generates a reference AC signal SIGref1 on said output 72, in phase with the AC voltage on first input VACin1. As described above, this reference AC signal SIGref1 is used when operating in normal mode to generate first reference current Iref1 by means of first voltage regulation unit 41.

As represented in FIGS. 2 and 3, the set of units used when operating in normal mode further includes a second reference AC signal generator 73 equipped with an output 74 and connected via a line 75 to means 76 for measuring the AC voltage on second input VACin2. This second generator generates a reference AC signal SIGref2 on said output 74, in phase with the AC voltage on second input VACin2. This reference AC signal SIGref2 is used when operating in normal mode to generate second reference current Iref2 by means of second voltage regulation unit 44.

As previously described, control means 13 includes switching means for switching between at least a part of the set of units used when switching from economic mode to normal mode.

As represented in FIG. 2, the switching means includes a first switch 121 and a second switch 122 to connect output 42 of first voltage regulation unit 41 to input 22 of first current regulation unit 21 by means of first switch 121, and to connect output 45 of second voltage regulation unit 44 to input 24 of second current regulation unit 23 by means of second switch 122, when operating in normal mode. In other words, when operating in normal mode, first voltage regulation unit 41 supplies a first reference current Iref1 to reference current input 22 of first current regulation unit 21, and second voltage regulation unit 44 supplies a second reference current Iref2 to reference current input 24 of second current regulation unit 23.

Thus, when operating in normal mode, the regulation of each converter includes an internal current regulation loop via first and second current regulation units 21 and 23 respectively dedicated to the first and second converters. The regulation of each converter further includes an external voltage regulation loop via first and second voltage regulation units 41 and 44 respectively dedicated to the first and second converters.

As represented in FIG. 3, first switch 121 and second switch 122 of switching means, when operating in economic mode, enable output 42 of first voltage regulation unit 41 to be connected to an intermediate connection means 123 by means of first switch 121, and input 24 of second current regulation unit 23 to be connected to said intermediate connection means 123 by means of second switch 122. In other words, when operating in economic mode, output 42 of first voltage regulation unit 41 is connected to input 24 of second current regulation unit 23. Intermediate connection means 123 can be an electricity conducting element, as represented in FIGS. 2 and 3. It can also be any software means enabling such a connection function to be achieved.

In operation in economic mode represented in FIG. 3, reference current input 22 of first current regulation unit 21 is disconnected. First current regulation unit 21 is therefore not used and first converter 1 is shut down.

Thus, in operation in economic mode, the internal current regulation loops via first and second current regulation units 21 and 23 remain unchanged, except that the loop dedicated to the first converter is inoperative because the latter is shut down. In operation in economic mode, the second converter therefore performs two functions at the same time. The first function consists in automatically recharging batteries 11 by taking a sine wave current presenting a power factor close to one and a low harmonic factor from the second source 8, also called bypass AC. The second function of the second converter is to generate a current on power supply output 3 compensating both the harmonic current and the reactive current of the load. In operation in economic mode, second converter 2 therefore supplies the reactive and harmonic part of the current in the load. The active part of this current is for its part supplied by second source 8. This active part also serves the purpose of supplying the energy necessary for power supply of the second converter and of the auxiliaries connected between the two converters, including battery 11.

As represented in FIGS. 2 and 3, the switching means includes a third switch 131. As represented in FIG. 2, when operating in normal mode, the third switch enables synchronization input 43 of first voltage regulation unit 41 to be connected to output 72 of first generator 71. As represented in FIG. 3, when operating in economic mode, the third switch enables synchronization input 43 of first voltage regulation unit 41 to be connected to output 74 of second generator 73.

Thus, in operation in economic mode, the current on second input 7 of uninterruptible power supply supplied by source 8 includes few harmonics, and its reactive part is minimized. At the same time, the global energy efficiency is improved by the fact that the first converter is shut down and that the energy necessary for the uninterruptible power supply is supplied by the second source.

Furthermore, implementation of the invention does not require a control or regulation unit dedicated to operation in economic mode. Only at least a part of the units dedicated to operation in normal mode is used when operating in economic mode, by means of the switching means. This makes uninterruptible power supplies extremely easy to implement, in particular those of the double conversion type.

Figure 9:
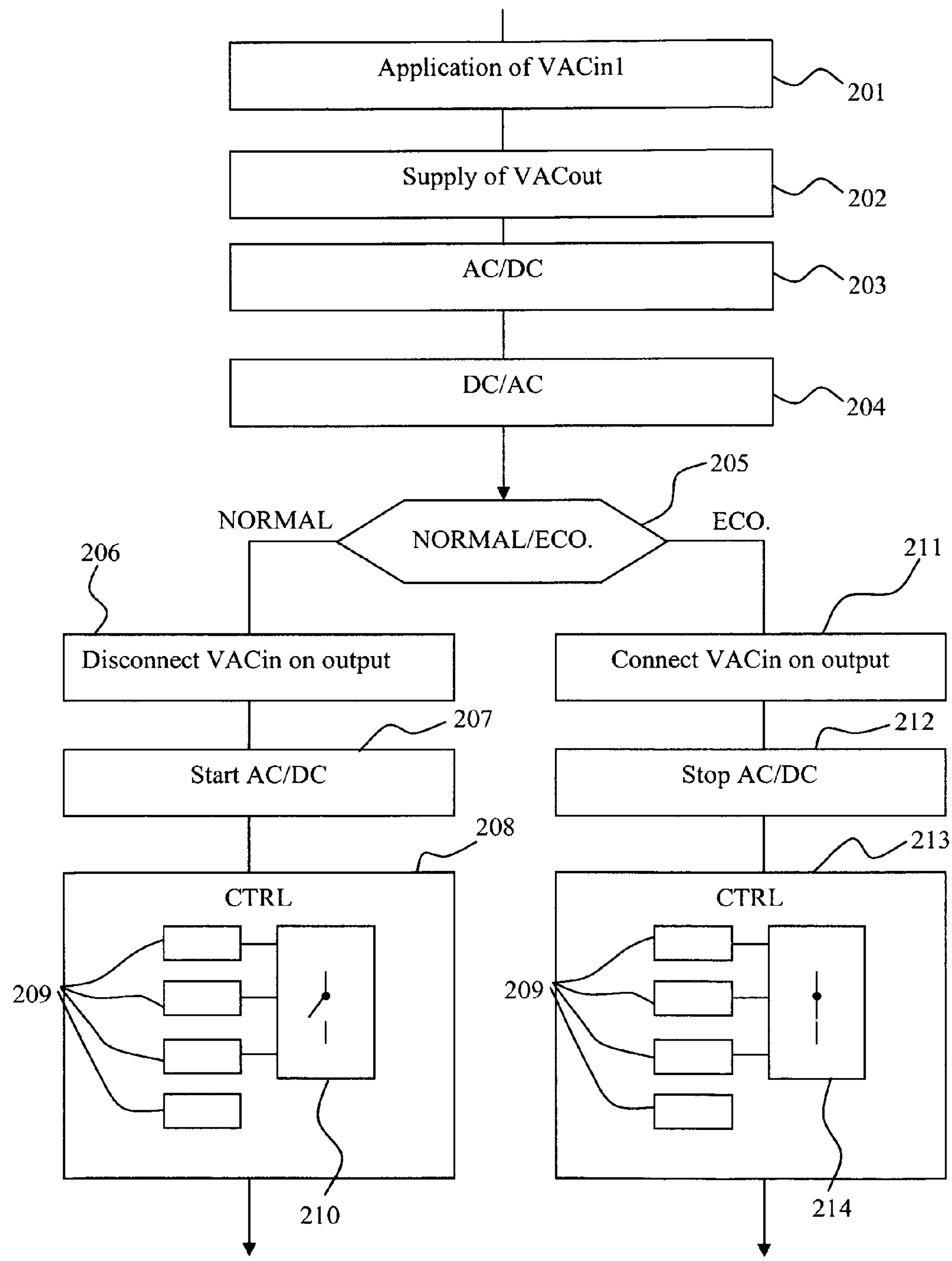
FIG. 9 is a flowchart representative of the uninterruptible power supply method according to an embodiment.

As shown by the flowchart of FIG. 9, the method of the invention includes application 201 of a first AC voltage VACin1 on at least one first input 5, supply 202 of an uninterruptible electric power supply on a power supply output 3, a first AC/DC conversion 203 of the first AC voltage into DC voltage VDC, a second DC/AC conversion 204 of the DC voltage into an AC supply voltage VACout, in either direction, and an operating mode test step 205 to determine whether the uninterruptible power supply has to be operated in normal mode or in economic mode.

When operating in normal mode NORMAL, the method includes a step 206 of interrupting direct connection of an input to the power supply output or of maintaining disconnected state, a step 207 of starting or maintaining the first AC/DC conversion, and a control step 208 by a set of regulation functions 209, said functions interacting with one another according to a first switching state 210.

When operating in economic mode ECO, the method includes a step 211 of direct connection of the input to the power supply output or of maintaining connected state, a step 212 of stopping or maintaining shut-down state of the first AC/DC conversion, and a control step 213 including at least a part of the set of regulation functions 209, the functions interacting with one another according to a second switching state 214 to regulate the quality of the current on second input 7 of the uninterruptible power supply.

The invention claimed is:

1. An uninterruptible power supply comprising:
- at least one first input for connecting to a first AC voltage source,
- a power supply output for connecting to an electric load,
- a first converter for converting the AC voltage on the first input into a DC voltage,
- a bi-directional second converter for converting the DC voltage into AC voltage on the power supply output,
- a branching and/or selection circuit equipped with interrupting means for connecting a second input directly to the power supply output when operating in an economic mode wherein the first converter is shutdown, and
- control means comprising a set of units for use when operating in normal mode in which the second input is disconnected from the power supply output by opening the interrupting means of the branching and/or selection circuit, and
- the set of units comprises:
  - a first voltage regulation unit equipped with an output for supplying a first reference current, and
  - a second current regulation unit of the second converter equipped with a reference current input, and
- the control means comprises switching means for connecting the output of the first voltage regulation unit to the input of the second current regulation unit for regulating the current at said second input when operating in the economic mode.

2. The uninterruptible power supply according to claim 1, wherein the set of units for use when operating in normal mode comprises a first current regulation unit of the first converter having a reference current input, the first current regulation unit for being shut down when operating in the economic mode.

3. The uninterruptible power supply according to claim 2, wherein the set of units for use when operating in normal mode comprises a second voltage regulation unit equipped with an output for supplying a second reference current, the output of the first voltage regulation unit being connected to the reference current input of the first current regulation unit and the output of the second voltage regulation unit being connected to the reference current input of the second current regulation unit, when operating in normal mode.

4. The uninterruptible power supply according to claim 3, wherein the switching means comprises a first switch and a second switch for:
- connecting the output of the first voltage regulation unit to the input of the first current regulation unit by means of the first switch when operating in normal mode, and
- connecting the output of the second voltage regulation unit to the input of the second current regulation unit by means of the second switch,
- connecting the output of the first voltage regulation unit to an intermediate connection means by means of the first switch and
- connecting the input of the second current regulation unit to said connection means by means of the second switch, when operating in the economic mode.

5. The uninterruptible power supply according to claim 4, wherein the units for use when operating in normal mode are electronic circuits and the switches are multiplexers or analog switches controlled by a processing unit.

6. The uninterruptible power supply according to claim 4, wherein the units for use when operating in normal mode and the switches comprise software in a processing unit.

7. The uninterruptible power supply according to claim 1, wherein the set of units for use when operating in normal mode comprises at least one first reference AC signal generator equipped with an output and connected to means for measuring the AC voltage at the first input, wherein said first reference AC signal generator is for generating a reference AC signal on said output in phase with the AC voltage on the first input.

8. The uninterruptible power supply according to claim 7, wherein the second input is for connecting to a second AC voltage source, and the interrupting means of the branching and/or selection circuit enabling said second input is for connecting directly to the power supply output when operating in the economic mode.

9. The uninterruptible power supply according to claim 8, wherein the set of units for use when operating in normal mode comprises a second reference AC signal generator equipped with an output and connected to means for measuring the AC voltage on the second input, wherein said second reference AC signal generator is for generating a reference AC signal on said output in phase with the AC voltage on the second input.

10. The uninterruptible power supply according to claim 9, wherein the switching means comprises a third switch for:
- connecting a synchronization input of the first voltage regulation unit to the output of the first generator when operating in normal mode, and
- connecting said synchronization input of the first voltage regulation unit to the output of the second generator when operating in the economic mode.

11. The uninterruptible power supply according to claim 1, further comprising electric power storage means arranged between the first and second converter.

12. A method for providing an uninterruptible electric power supply comprising:
- applying a first AC voltage to at least one first input,
- supplying an uninterruptible electric power supply to a power supply output, converting the first AC voltage into DC voltage in a first direction, converting the DC voltage into AC supply voltage in a second direction, directly connecting a second input to the power supply output when operating in an economic mode, and controlling the uninterruptible electric power supply by a set of regulation functions for use when operating in normal mode in which said direct connection is interrupted, by stopping the conversion of the first AC voltage into DC voltage, when operating in the economic mode, and controlling further comprises:

using a first voltage regulation function to supply a first reference current, using a second current regulation function by receiving a reference current, and regulating the current at the second input by switching the first reference current from the first voltage regulation function to the second current regulation function, when operating in economic mode.

13. The method according to claim 12, wherein the set of regulation functions for use when operating in normal mode comprises a first current regulation function received by a reference current, wherein the first current regulation function stops when operating in the economic mode.

14. The method according to claim 13, wherein the set of regulation functions for use when operating in normal mode comprises a second voltage regulation function to supply a second reference current when operating in normal mode, wherein the first voltage regulation function supplies the first reference current applied to the first current regulation function and the second voltage regulation function supplies the second reference current applied to the second current regulation function.

15. The method according to claim 14, wherein the switching enables, the first reference current to be applied to the first current regulation function and the second reference current to be applied to the second current regulation function when operating in normal mode, and the first reference current to be applied to the second current regulation function when operating in the economic mode.

16. The method according to claim 12, wherein the set of regulation functions for use when operating in normal mode comprises generating a first reference AC signal synchronized with the first AC voltage to supply a reference AC signal in phase with the first AC voltage.

17. The method according to claim 16, comprising applying a second AC voltage on the second input when operating in the economic mode, the second input being connected to the power supply output.

18. The method according to claim 17, wherein the set of regulation functions for use when operating in normal mode comprises generating a second reference AC signal synchronized with the second AC voltage to supply a reference AC signal in phase with the second AC voltage.

19. The method according to claim 18, wherein the switching enables:

synchronization of the first reference current with the first reference AC signal when operating in normal mode, and synchronization of the first reference current with the second reference AC signal when operating in the economic mode.

20. The method according to claim 12, wherein converting the first AC voltage into DC voltage comprises storing electric power, when operating in normal mode, and wherein converting the DC voltage into AC supply voltage comprises storing electric power.

* * * * *